US006356262B1

United States Patent
Klosowski et al.

(10) Patent No.: US 6,356,262 B1
(45) Date of Patent: Mar. 12, 2002

(54) SYSTEM AND METHOD FOR FAST POLYHEDRAL CELL SORTING

(75) Inventors: James Thomas Klosowski, Rye, NY (US); Claudio T. Silva, Mahwah, NJ (US); Gabriel Taubin, Hartsdale, NY (US); Peter Lawrence Williams, Livermore, CA (US); Joseph Shannon Baird Mitchell, Port Jefferson, NY (US); Joao Luiz Dihl Comba, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/292,704

(22) Filed: Apr. 15, 1999

Related U.S. Application Data

(60) Provisional application No. 60/082,009, filed on Apr. 16, 1998.

(51) Int. Cl.$^7$ .............................................. G06T 15/40
(52) U.S. Cl. ...................................... 345/421; 345/619
(58) Field of Search ............................... 345/421, 433, 345/440, 423, 619

(56) References Cited

U.S. PATENT DOCUMENTS

| | | | | |
|---|---|---|---|---|
| 5,459,822 A | | 10/1995 | Izawa et al. ................ 345/422 |
| 5,555,352 A | | 9/1996 | Lucas ......................... 345/423 |
| 5,742,293 A | * | 4/1998 | Koyamada et al. ......... 345/421 |
| 5,914,721 A | * | 6/1999 | Lim ............................ 345/421 |
| 6,172,679 B1 | * | 1/2001 | Lim ............................ 345/421 |

OTHER PUBLICATIONS

C.Silva et al, An Exact Interactive Time Visibility Ordering Algorithm for Polyhedral Cell Complexes.
ACM Symposium on Volume Visualization, 10/98, pp. 87–94.

J. Comba et al, Fast Polyhedral Cell Sorting for Interactive Rendering of Unstructured Grids.

Eurographics '99/P. Brunet and R. Scopigno, vol. 18 (1999), No. 3.

\* cited by examiner

Primary Examiner—Mark Zimmerman
Assistant Examiner—Huedung X. Cao
(74) Attorney, Agent, or Firm—Louis J. Percello; Ohlandt, Greeley, Ruggiero & Perle, LLP

(57) ABSTRACT

The visibility ordering of polyhedral cells is efficiently determined by building an ordering graph, comprising oriented edges between two cells. Each edge (A,B) corresponds to the fact that cell A has to be projected, or rendered, before B. A set of ordering relations and rules that can be shown to generate, if one exists, a global ordering of the polyhedral cell complex. Three different types of edges are used to accomplish this: MPVO, BSP and PPC edges. MPVO edges exist between two cells that share a face. To define the BSP edges, a BSP-tree of the boundary faces of the cell complex is constructed. During this construction, some of the boundary faces of the cells will be 'cut' by the BSP-tree 'extended' faces, into multiple pieces. If C is the boundary cell, and c', c", and so on, are the pieces of its boundary faces, the BSP_edge (c', C) is defined to mean that cell C can only be projected after c' has been projected by the BSP. A cell C is in the PPC if one of the pieces that compose it, say c', has been projected by the BSP, but there exist other pieces of cell C that have not been projected. In this case, additional checks are done to ensure cells are not being projected out of order. This is accomplished by performing 'ray shooting'.

8 Claims, 18 Drawing Sheets

SYSTEM AND METHOD FOR FAST POLYHEDRAL CELL SORTING

This application claim benefit to provisional 60/082,009 filed Apr. 16, 1998.

FIELD OF THE INVENTION

This invention relates to rendering three dimensional objects and/or volumes on a graphics computer. More specifically, the invention relates to ordering polyhedral cells of volumes in a visibility order for efficient visualization.

BACKGROUND OF THE INVENTION

A visibility ordering of a set of objects, from a given viewpoint, is a total order on the objects such that if object A obstructs object B, then B precedes A in the ordering. Such orderings are extremely useful in computer graphics. Since the late 1960s, several algorithms have been proposed for computing visibility ordering of objects. The classic article by Sutherland, Sproull and Schumacker ("A Characterization of Ten Hidden-Surface Algorithms", ACM Computing Surveys, 1974), summarizes the early work in the area. At that point, the focus of the visibility ordering work was performing hidden-surface removal. With the advent of the z-buffer, computing visibility orderings was not so important anymore, since such computations were expensive, and the z-buffer provided a simple and effective (hardware) solution to the hidden-surface removal problem.

In the late 1980s, volume rendering, and other graphics techniques were developed, which again required solutions to the visibility ordering problem. In these techniques, it did not suffice to simply flag whether a particular surface (or piece thereof) was visible, but it was necessary to actually compute a global ordering, which then could be used to paint them on the screen in the right order. In Max, Hanranhan, Crawfis ("Area and Volume Coherence for Efficient Visualization of 3D Scalar Functions", pp 27–33, Computer Graphics (San Diego Workshop on Volume Visualization, 1990)), a technique is proposed which can be used to compute visibility ordering of a special kind of mesh, namely a Delaunay triangulation. In Peter Williams ("Visibility Ordering Meshed Polyhedra", ACM Transactions on Graphics, 1992), a more general technique was proposed, which still only worked correctly for special kind of meshes, in particular, meshes composed of convex cells, which have no holes, and where the boundary of the whole set of cells was convex. In this work, some heuristics for general datasets were proposed.

The first published solution to an efficient technique for computing the "exact" (that is, correct) visibility ordering of a set of polyhedral cells was proposed in Stein, Becker, and Max ("Sorting and hardware assisted rendering for volume visualization", Symposium on Volume Visualization, 1994). There, an extension of the previous work of Newell, Newell and Sancha ("Solution to the hidden surface problem", Proc ACM National Conference, 1972) was proposed. Later, in Williams, Max, and Stein ("A high accuracy volume renderer for unstructured data", IEEE Transactions on Visualization and Computer Graphics, 1998), a faster variation of the technique is described. A technique similar to Stein et al, is also described in Karasick, Lieber, Nackman, and Rajan ("Visualization of three-dimensional Delaunay meshes", Algorithmica 1997).

PROBLEMS WITH THE PRIOR ART

Prior art can be roughly divided into three classes: (I) exact visibility-ordering techniques which are general (that is, work for all types of meshes); (II) exact visibility-ordering techniques which have limited applicability (that is, only work correctly for certain types of meshes); (III) and heuristic techniques, which only approximate the visibility ordering of polyhedral cells.

Class I algorithms have quadratic complexity, and have shown to be very slow in practice, and not suitable for use in any kind of interactive application.

Class II algorithms, although fast and suitable for use, have limited scope, and can only be applied for certain types of meshes.

Class III algorithms are not suited for use in interactive applications, mainly because they usually lead to errors in the computed images, which in general might lead to undesirable results. Using Class III algorithms compromises not only the quality of the visualization, but ultimately it can lead to incorrect conclusions. For instance, a medical doctor can not rely on results obtained by using such techniques.

OBJECTS OF THE INVENTION

An object of this invention is an improved method for computing visibility ordering of polyhedral cells.

An object of this invention is an improved system and method for rendering three dimensional volumes.

An object of this invention is an improved system and method for quickly and efficiently rendering three dimensional volumes represented by large data sets.

An object of this invention is an improved system and method for quickly and efficiently rendering three dimensional volumes represented by unstructured (non convex) and large data sets where the volumes are sorted in a visibility order.

SUMMARY OF THE INVENTION

We propose a system and method for efficiently computing the visibility ordering of polyhedral cells.

In order to compute such orderings, our invention builds an ordering graph, composed of oriented edges between two cells. Each edge (A,B) corresponds to the fact that cell A has to be projected, or rendered, before B.

Our invention comprises a set of ordering relations and rules that can be shown to generate, if one exists, a global ordering of the polyhedral cell complex. Our invention uses three different types of edges to accomplish this: Meshed Polyhedra Visibility Ordering (MPVO), Binary Space Partition (BSP) and Partially Projected Cell (PPC) edges, where MPVO edges are prior art described in "Visibility Ordering Meshed Polyhedra" by Peter Williams, and BSP and PPC edges are new for our invention.

MPVO edges exist between two cells that share a face.

BSP edges: In order to define the BSP edges, we must first compute a BSP-tree of the boundary faces of the cell complex. During this construction, some of the boundary faces of the cells will be 'cut' by the BSP-tree 'extended' faces, into multiple pieces. If we say C is the boundary cell, and c', c", and so on, are the pieces of its boundary faces, we define BSP_edge (c', C) to mean that cell C can only be projected after c' has been projected by the BSP.

PPC edges: We say a cell C is in the PPC if one of the pieces that compose it, say c', has been projected by the BSP, but there exist other pieces of cell C that have not been projected. In this case, our system needs to perform additional checks to ensure cells are not being projected out of order. This is accomplished by performing 'ray shooting' queries, which we call XMPVO queries.

BRIEF DESCRIPTION OF THE FIGURES

The foregoing and other objects, aspects, and advantages will be better understood from the following non limiting detailed description of preferred embodiments of the invention with reference to the drawings that include the following.

DETAILED DESCRIPTION OF THE INVENTION

Figure 1:
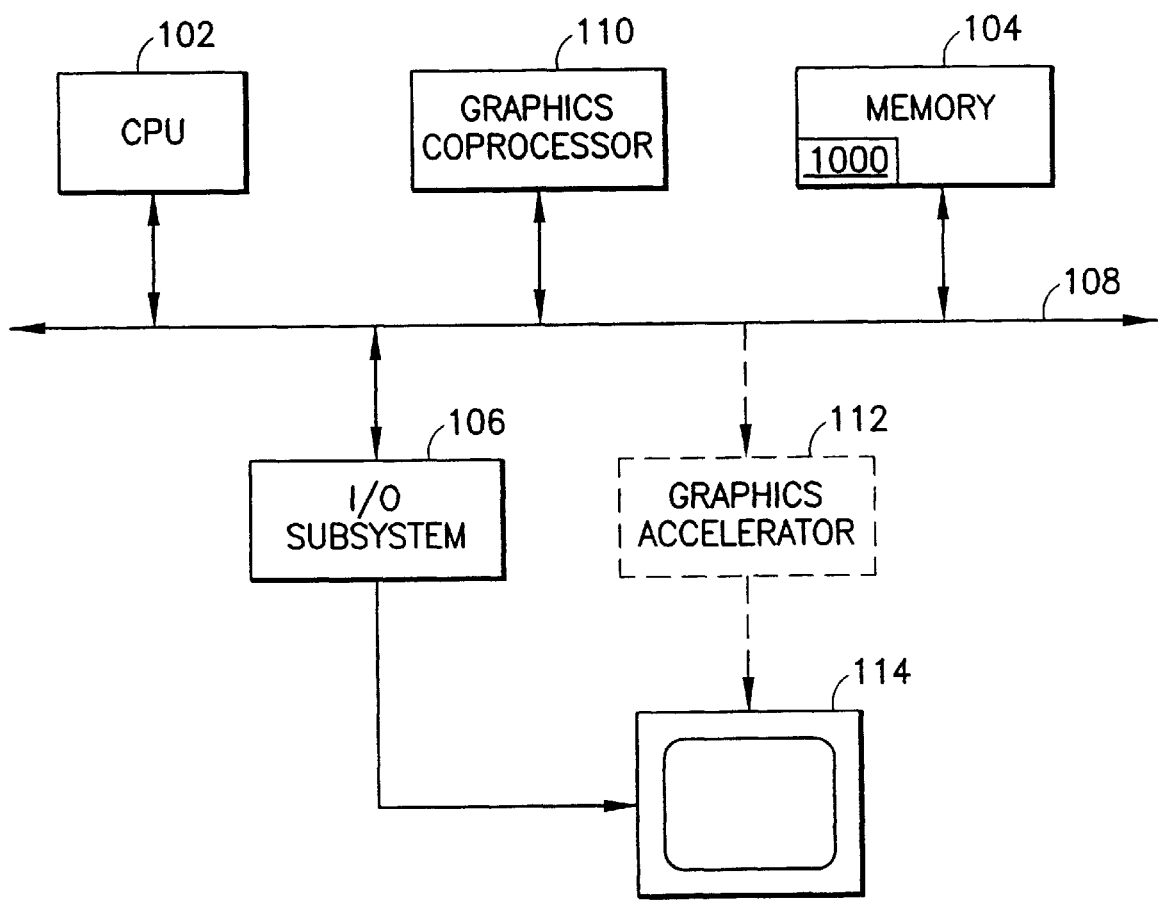
FIG. 1 is a block diagram of one embodiment of an graphics computer.

FIG. 1 is a block diagram of one embodiment of a graphics computer. A graphics computer is typically comprised of a well known Central Processing Unit (CPU) 102, a memory subsystem 104, and an Input Output (I/O) subsystem 106. These subsystems communicate through a data bus 108. The system might also include a graphics coprocessor 110 which can offload from the CPU many computation-intensive tasks. An optional graphics accelerator subsystem 112 can also be used by the system. The images produced by the graphics computer are visualized using the display 114. The processes 1000 described in FIGS. 10 and 11A–11H are typically stored in the memory 104 and executed by the CPU 102.

Figure 2:
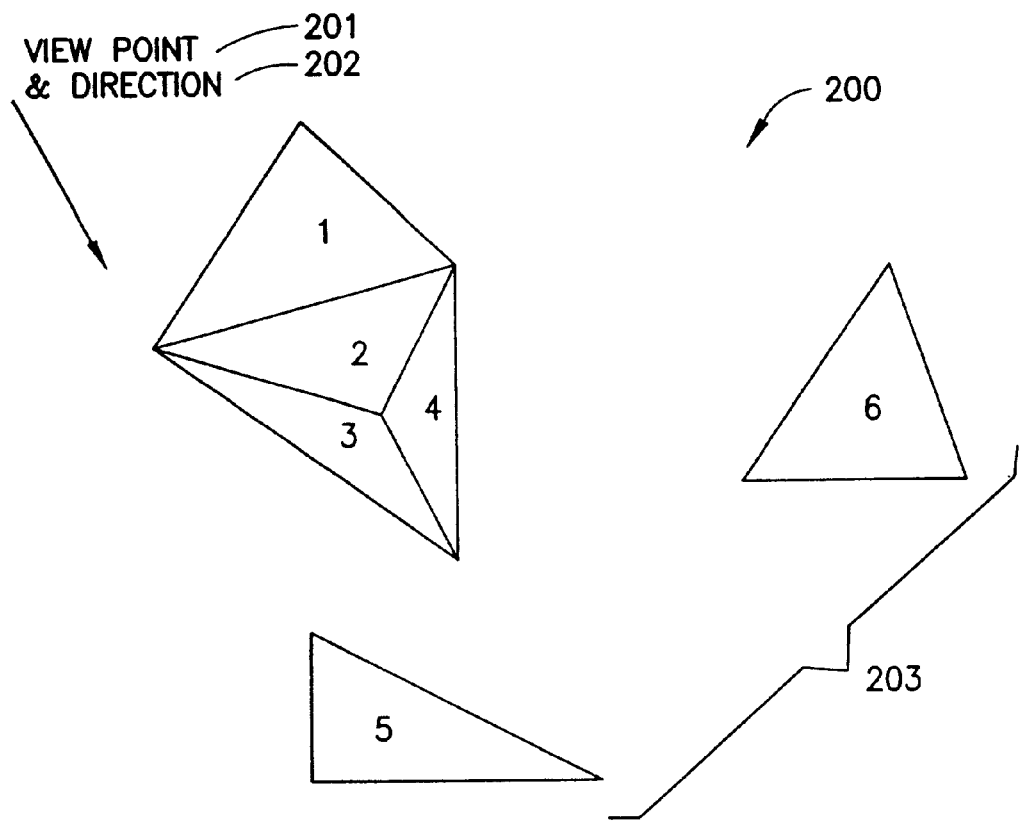
FIG. 2 is a drawing of several polyhedral cells in a space with their visibility ordering numbers indicated.

FIG. 2 is a drawing of six polyhedral cells 203 in space together with a viewpoint 201 and viewing direction 202. To illustrate the concept of a visibility ordering, we have numbered each of the cells according to their visibility ordering. To render the cells in correct order, we render the cells from largest number to smallest number.

Figure 3:
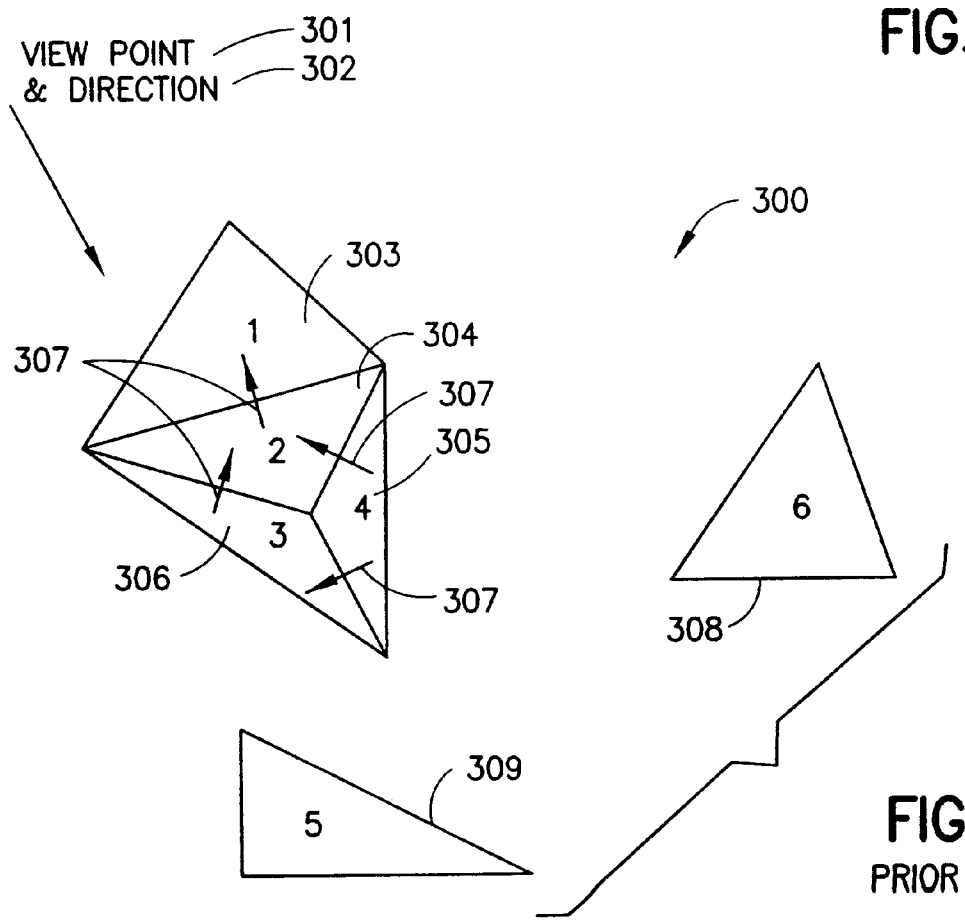
FIG. 3 is a drawing of several polyhedral cells in a space with their MPVO ordering indicated.

FIG. 3 is a drawing of the same six polyhedral cells in FIG. 2 together with the MPVO visibility ordering relations. To determine the MPVO (prior art) relations, or dependencies, a viewpoint 301 and a view direction 302 are specified. MPVO dependencies exist between cells that share a face. In this diagram 300, cell 5 (309) and cell 6 (308) do not have any MPVO dependencies since they do not share faces with any other cells. However, cell 1 (303), cell 2 (304), cell 3 (306), and cell 4 (305) do have some faces in common. Therefore, we have indicated the MPVO dependencies by arrows 307 in the figure. Note that the direction of the arrow is of vital importance, as it indicates that which of the two neighboring cells needs to be projected, or rendered, first. Here, the arrow 307 points from the cell that should be projected first towards the cell that should be projected second. For example, we know that cell 2 (304) should be projected before cell 1 (303) since we are projecting cells in a back-to-front order with respect to the current viewpoint 301. Therefore, we have included an arrow 307 which points from cell 2 (304) to cell 1 (303).

Figure 4:
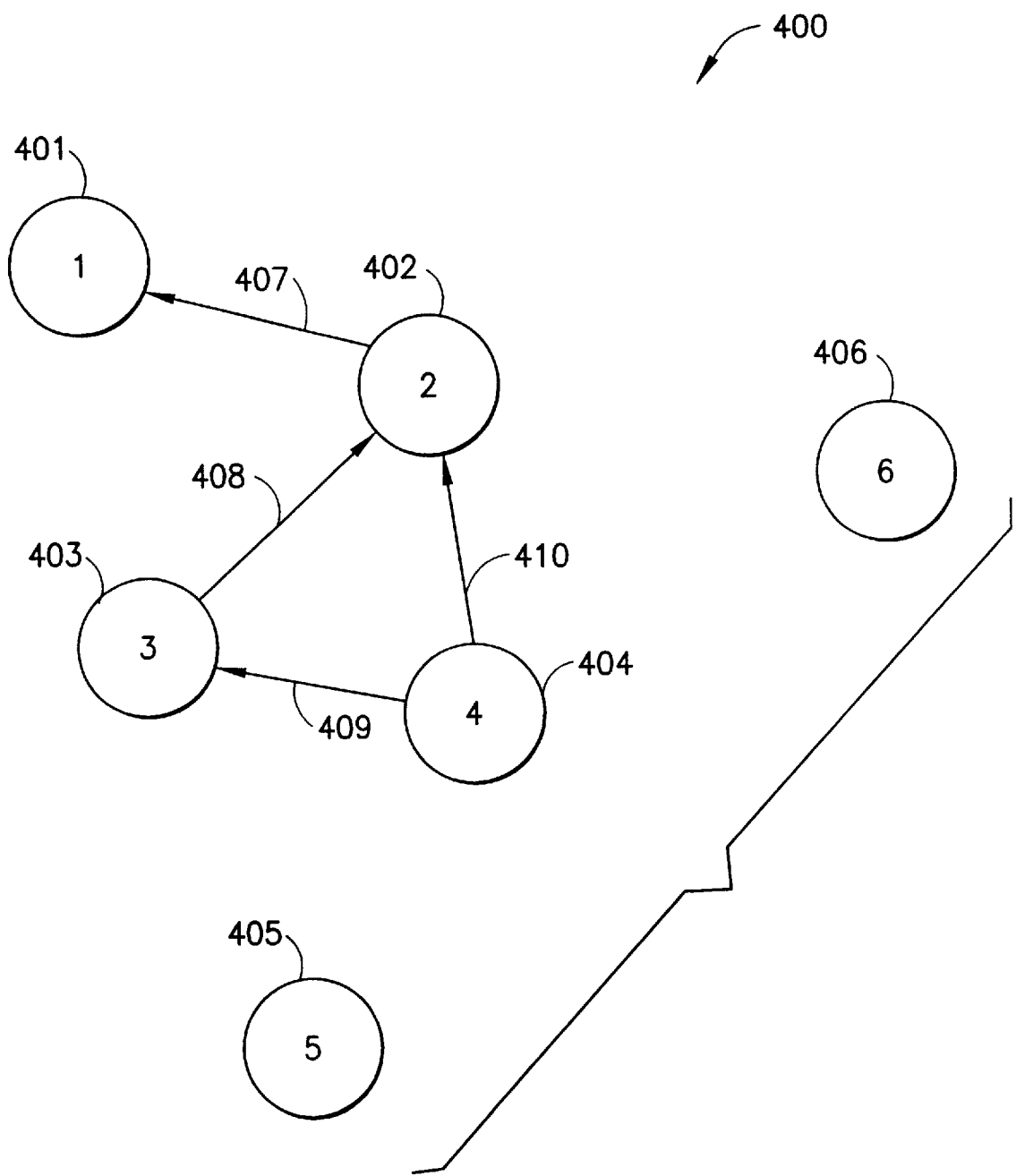
FIG. 4 is a drawing of a graph which indicates the MPVO ordering dependencies among polyhedral cells.

FIG. 4 is a drawing of a graph which indicates the MPVO ordering dependencies among polyhedral cells. The graph is used as a simple illustration of the MPVO dependencies. Each of the six original cells is represented by a numbered node of the graph 401–406. The MPVO dependencies highlighted in FIG. 3 are again represented by arrows 407–410, pointing from the cell that needs to be projected first, to the cell that needs to be projected second.

Figure 5:
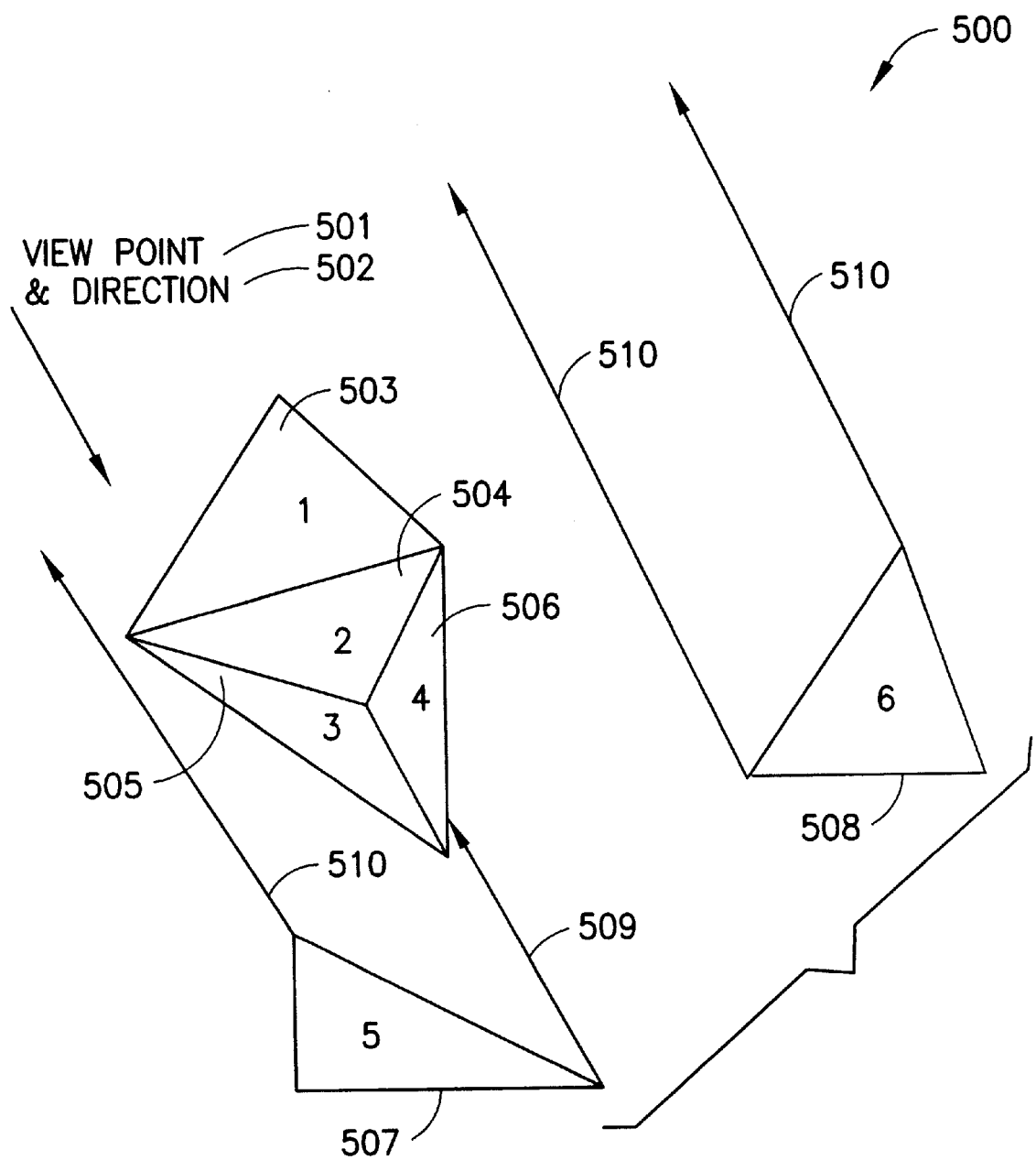
FIG. 5 is a drawing of several polyhedral cells in a space with their XMPVO (ray shooting) ordering indicated.

FIG. 5 is a drawing of the same six polyhedral cells in FIG. 2 together with their XMPVO (ray shooting) ordering indicated. In this case, the XMPVO ordering adds only one dependency between cell 5 (507) and cell 4 (506), which can be seen by the arrow 509 from cell 5 507 to cell 4 (506). Additional ray shooting queries 510 are indicated for clarity, even though they do not add any dependencies. The ray shooting queries are made in the opposite direction of the view direction 502.

Figure 6:
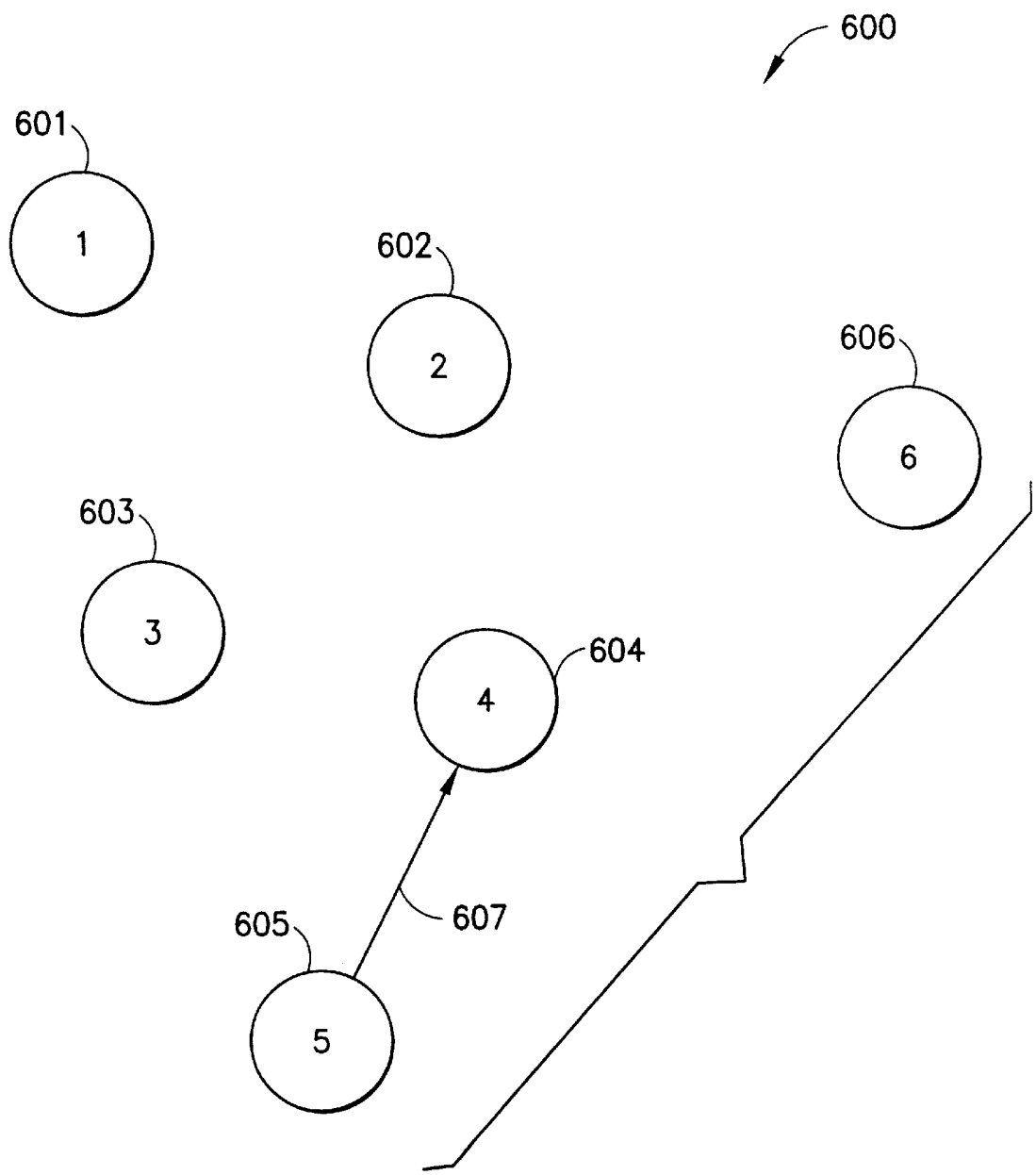
FIG. 6 is a drawing of a graph which indicates the XMPVO ordering dependencies among polyhedral cells.

FIG. 6 is a drawing of a graph which indicates the XMPVO ordering dependencies among polyhedral cells. The graph is used as a simple illustration of the XMPVO dependencies. Each of the six original cells is represented by a numbered node of the graph 601–606. The XMPVO dependency highlighted in FIG. 5 is again represented by an arrow 607, pointing from the cell that needs to be projected first 605, to the cell that needs to be projected second 604.

Figure 7:
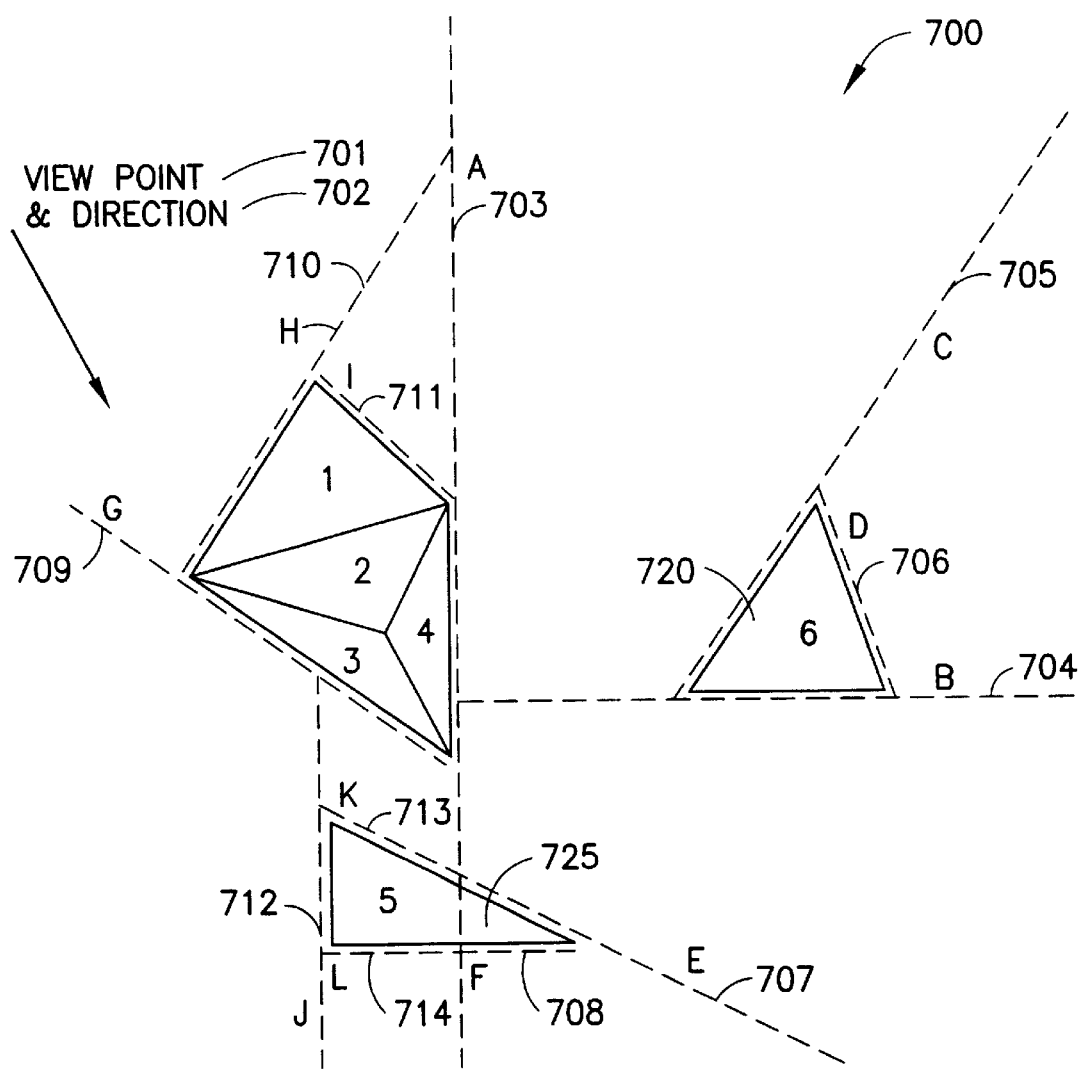
FIG. 7 is a drawing of several polyhedral cells in a space with a binary space partitioning (BSP) tree used in preferred embodiment of the invention.

FIG. 7 is a drawing of six polyhedral cells in a space with a binary space partitioning (BSP) tree used in a preferred embodiment of the invention. The viewpoint 701 and view direction 702 are indicated with an arrow. The BSP-tree is built upon the boundary faces of the cells. The cutting planes associated with the BSP-tree are highlighted by the letters A through L and the numbers 703 through 714, respectively. The BSP-tree was constructed in the order of the cutting planes. That is, plane A 703 was used first to cut the region of space into two smaller regions. Plane B 704 was used next to cut the right region, with respect to plane A 703, into two smaller regions. From the figure, we can see that cell 6 (720) has three boundary faces (704, 705, 706), none of which were cut by the BSP-tree construction phase. However, cell 5 (725), which originally had three boundary faces, ended up with five boundary segments (707, 708, 712, 713, 714) after the BSP-tree was constructed.

Figure 8:
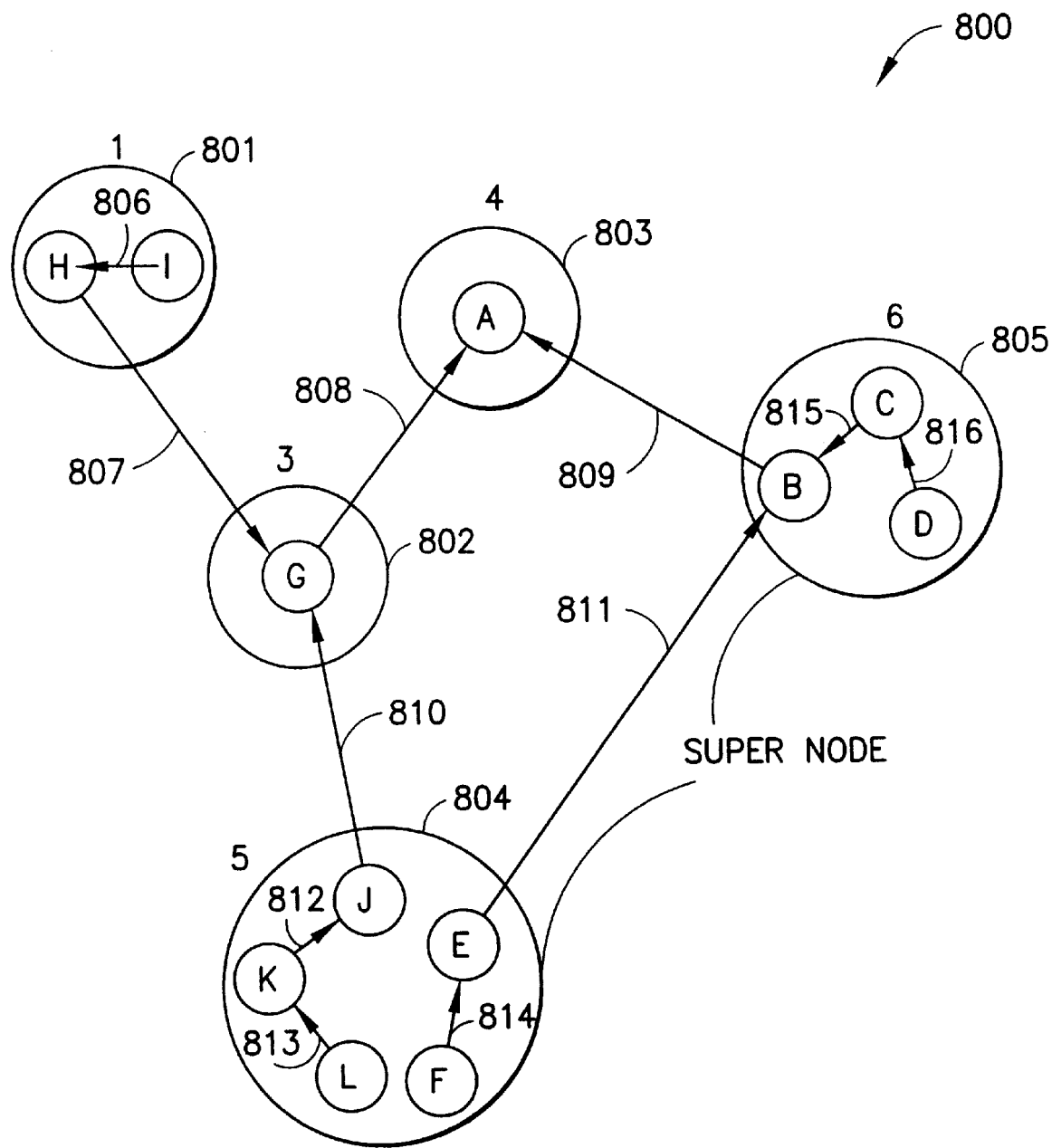
FIG. 8 is a drawing of a graph which indicates the BSP ordering dependencies among polyhedral cells.

FIG. 8 is a drawing of a graph which indicates the BSP ordering dependencies among the six polyhedral cells in FIG. 7. Each cutting plane from FIG. 7 was referenced by a letter A through L, respectively. Each of these cutting planes is represented here by circles labeled A through L, respectively. In addition, the cutting planes have been placed within larger circles 801–805 to indicate the cell that has a boundary face which lies on the cutting plane. For example, cell 4 (803) had only one boundary face in FIG. 7, therefore, the circle which represents cell 4 (803) in FIG. 8 contains only one smaller circle which represents the cutting plane along this boundary face. Similarly, cell 6 (805) had three boundary faces in FIG. 7 and thus has three smaller circles in this FIG. 8. The arrows 806–816, in the figure represent the BSP dependencies between the cells.

Figure 9:
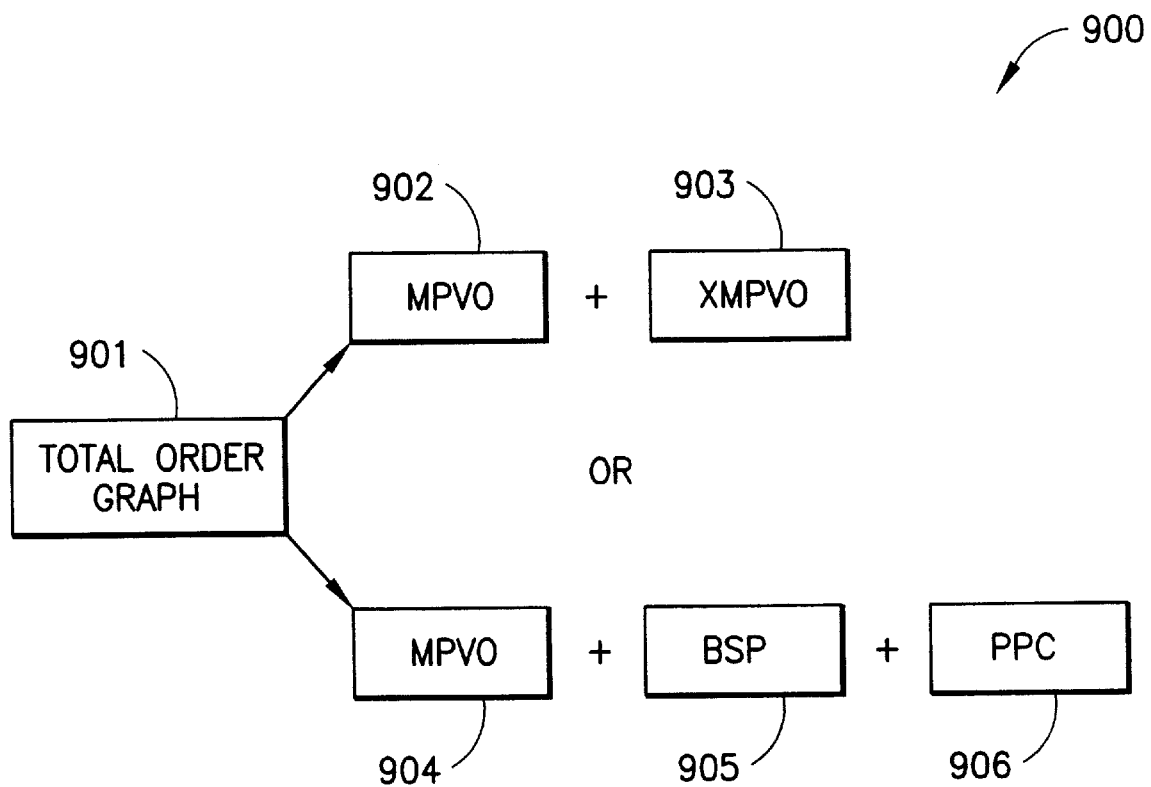
FIG. 9 is a block diagram which indicates how a total ordering can be achieved by our invention.

FIG. 9 is a block diagram 900 which indicates how a total visibility ordering 901 can be achieved by our invention. The visibility ordering can be comprised of the MPVO dependencies 902 and the XMPVO dependencies 903. In this case, all the visibility ordering relations among boundary cells are achieved by using ray-shooting queries. However, a more efficient means of achieving the ordering can be accomplished by using the MPVO dependencies 904, the BSP dependencies 905, and the PPC dependencies 906. Essentially, the introduction of the BSP dependencies enables us to eliminate a large number of ray-shooting queries, but not all of them. Cells that have a face cut by more than one BSP plane will be "partially projected" by the BSP. We collect these cells into a PPC (partially projected cell) set. In this case, ray-shooting queries only have to be performed against cells in the PPC. Note then, that using the BSP amounts to optimizing the visibility ordering graph. In the simple example illustrated in FIG. 2 through FIG. 8, the partially projected cell dependencies are equivalent to the XMPVO dependencies 903, although in general they are only a subset of them. Consequently, the BSP dependencies 905 and the PPC dependencies 906 are needed to replace the more expensive XMPVO dependencies.

Figure 10:
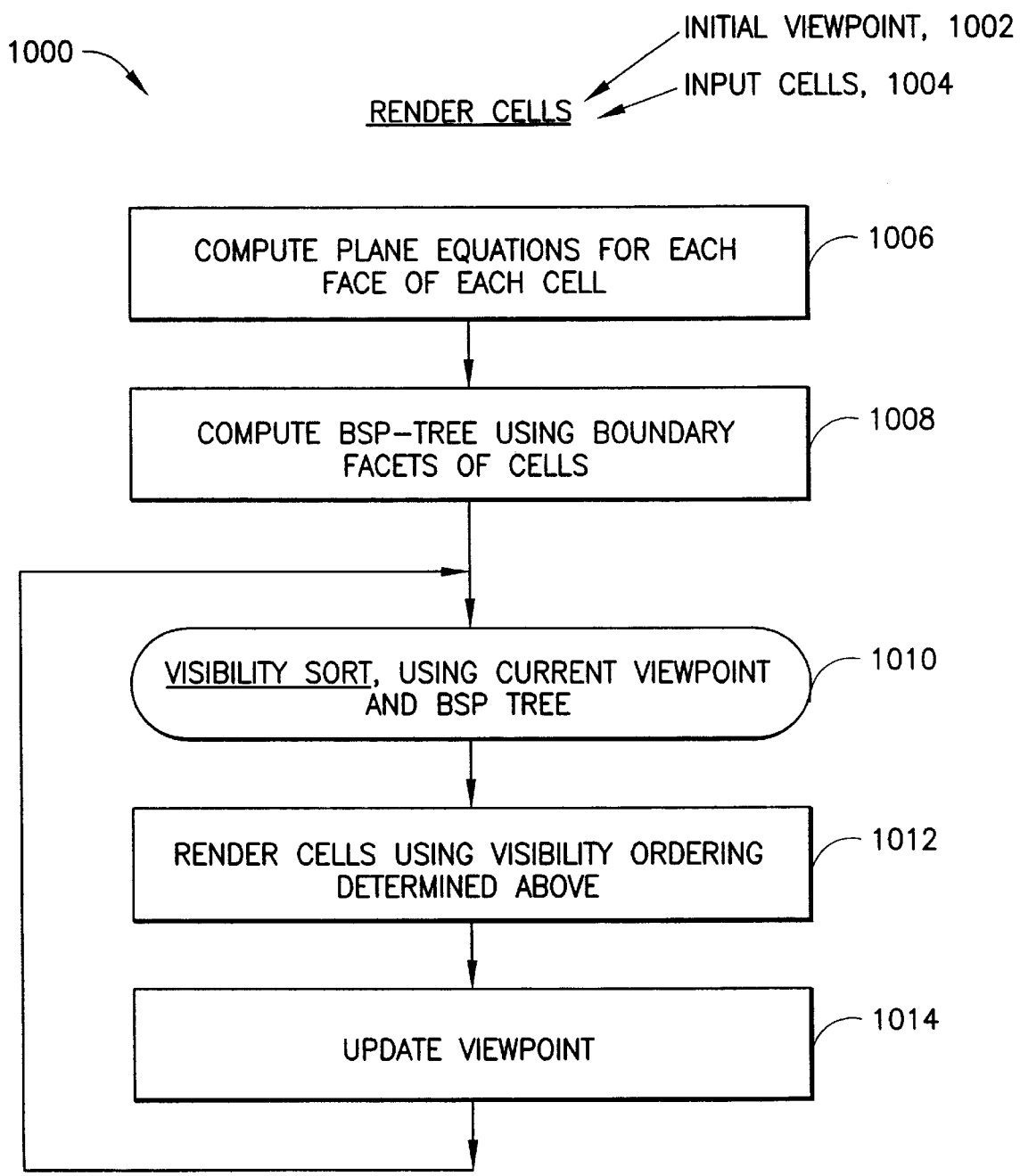
FIG. 10 is a flow chart of a rendering process.

FIG. 10 is a flow chart of a rendering process 1000, which sequentially renders the input polyhedral cells in visibility order for a series of viewpoints. The Render Cells process 1000 takes as input an initial viewpoint 1002 and a set of polyhedral cells 1004. Initially, the plane equation for each face of each input cell is computed 1006 using well-known techniques. The plane equations will be used later to determine 1103 the MPVO dependencies among the cells. A binary space partition tree, or BSP-tree, is computed 1008 using the boundary faces of the input cells. The technique used to build the BSP can be chosen among several well-known algorithms. A novel piece of our algorithm is that we use the BSP built upon the only the boundary faces to sort the internal cells. Using the current viewpoint and the BSP-tree, a Visibility Sort process 1010 is performed to sort in visibility order the input cells 1004. Our traversal algorithm is highlighted in FIGS. 11A–H. Using the visibility order, the input cells 1004 can then be rendered, using standard techniques, 1012 in the correct order. The viewpoint is then updated 1014 so that we can again perform our Visibility Sort process 1010 and render the cells 1012 using the updated viewpoint.

Figure 11A:
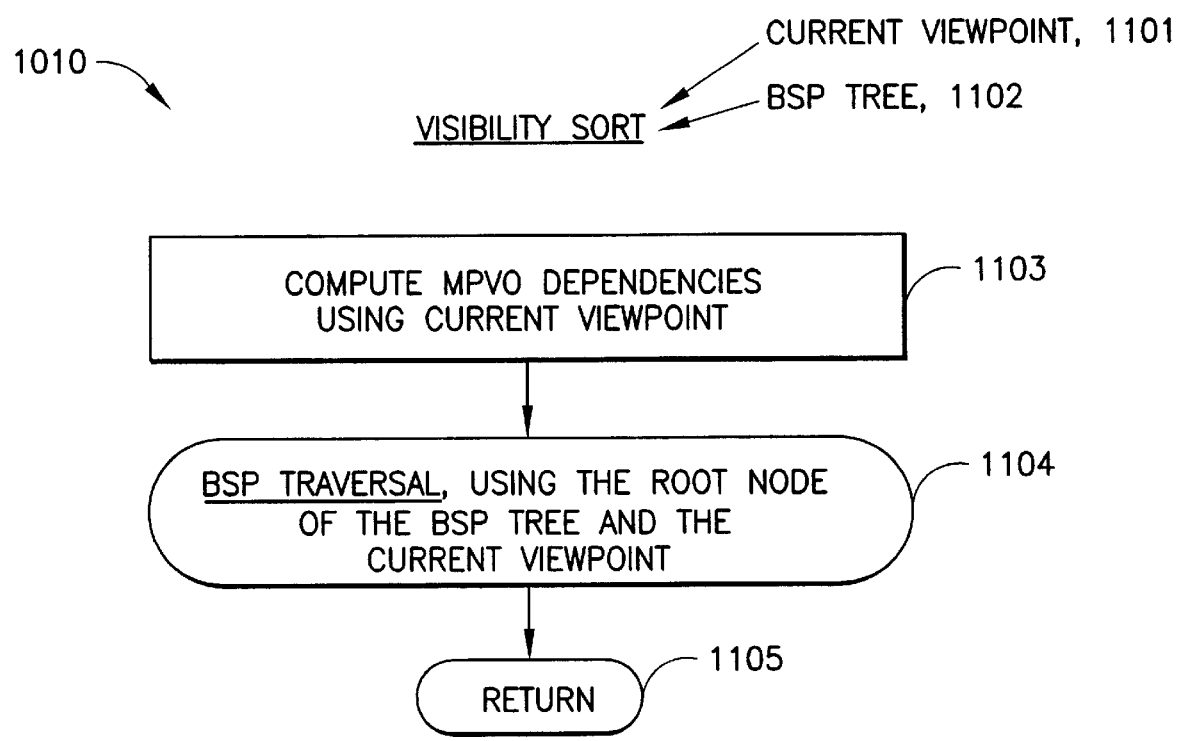
FIG. 11A is a flow chart of a visibility ordering process.

FIG. 11A is a flow chart of the Visibility Sort process 1010. Input for the visibility sort are the current viewpoint 1101 and the BSP-tree 1102 which was previously built upon the boundary faces of the input cells in process 1008. refer back to the piece in 1008 so it ties together? The first step in our visibility sort is to compute 1103 the MPVO dependencies between all cells which share a face. This prior art was described in "Visibility Ordering Meshed Polyhedra" by Peter Williams. The process 1010 then calls our recursive function BSP Traversal 1104, with the current viewpoint 1101 and the root node of the BSP-tree as input parameters. Once the recursive function has finished, the visibility sort is completed and we return 1105.

Figure 11B:
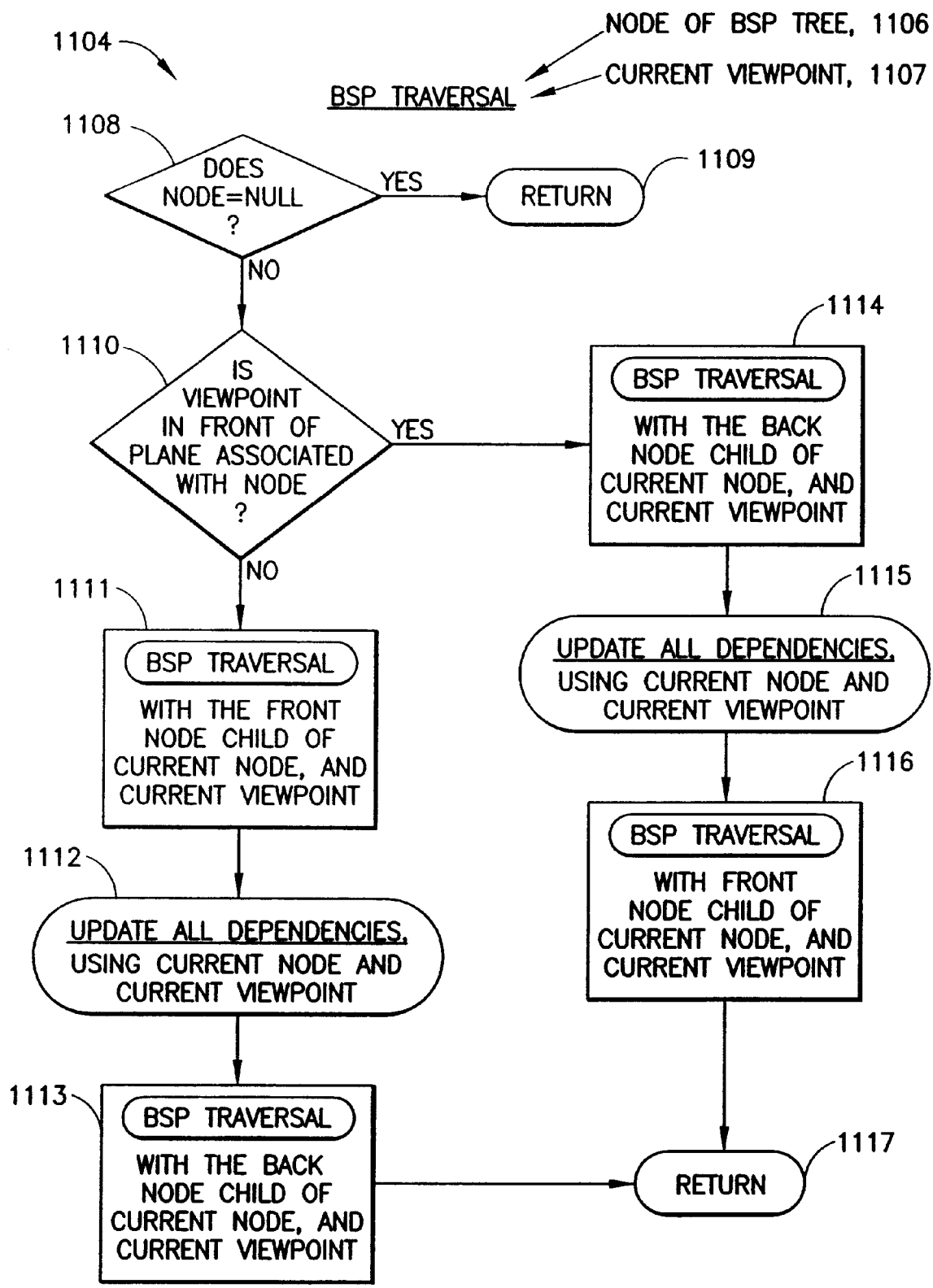
FIG. 11B is a flow chart of a BSP traversal process.

FIG. 11B is a flow chart of the BSP Traversal process 1104. The input parameters are a node 1106 of the BSP-tree and the current viewpoint 1107. Initially, we test 1108 if the node is equal to null. If it is, we return 1109 from the function. Otherwise, we test 1110 if the viewpoint 1107 is in front of the cutting plane associated with the node. This test is necessary as we want to visit the regions of space defined by the BSP-tree in back-to-front order, thereby helping us to find the visibility order of the cells. If the viewpoint is in front of the cutting plane, then to project the cells in a back-to-front order, we will need to visit the BACK child node, process the current node, and then visit the FRONT child node. If the viewpoint is in back of the cutting plane, we need to do the reverse: visit the FRONT child node, process the current node, and then visit the BACK child node.

If the node is in front of the cutting plane, we recursively call 1114 the BSP Traversal process with the current viewpoint and the BACK node child of the current node as input. Once this function call has returned, we call a process 1115 to Update All Dependencies, and then recursively call 1116 the BSP Traversal process with the current viewpoint and the FRONT node child of the current node as input. Once this function call is finished, we return 1117.

If the viewpoint is not in front of the cutting plane associated with the current node, we perform a similar sequence of function calls, although in the opposite order. Thus, we recursively call 1111 the BSP Traversal process with the current viewpoint and the FRONT node child of the current node as input. The Update All Dependencies process 1112 is then called, followed by the second call of the BSP Traversal process 1113, with the current viewpoint and the BACK child node of the current node as input. Once these function calls are finished, we return 1117.

Figure 11C:
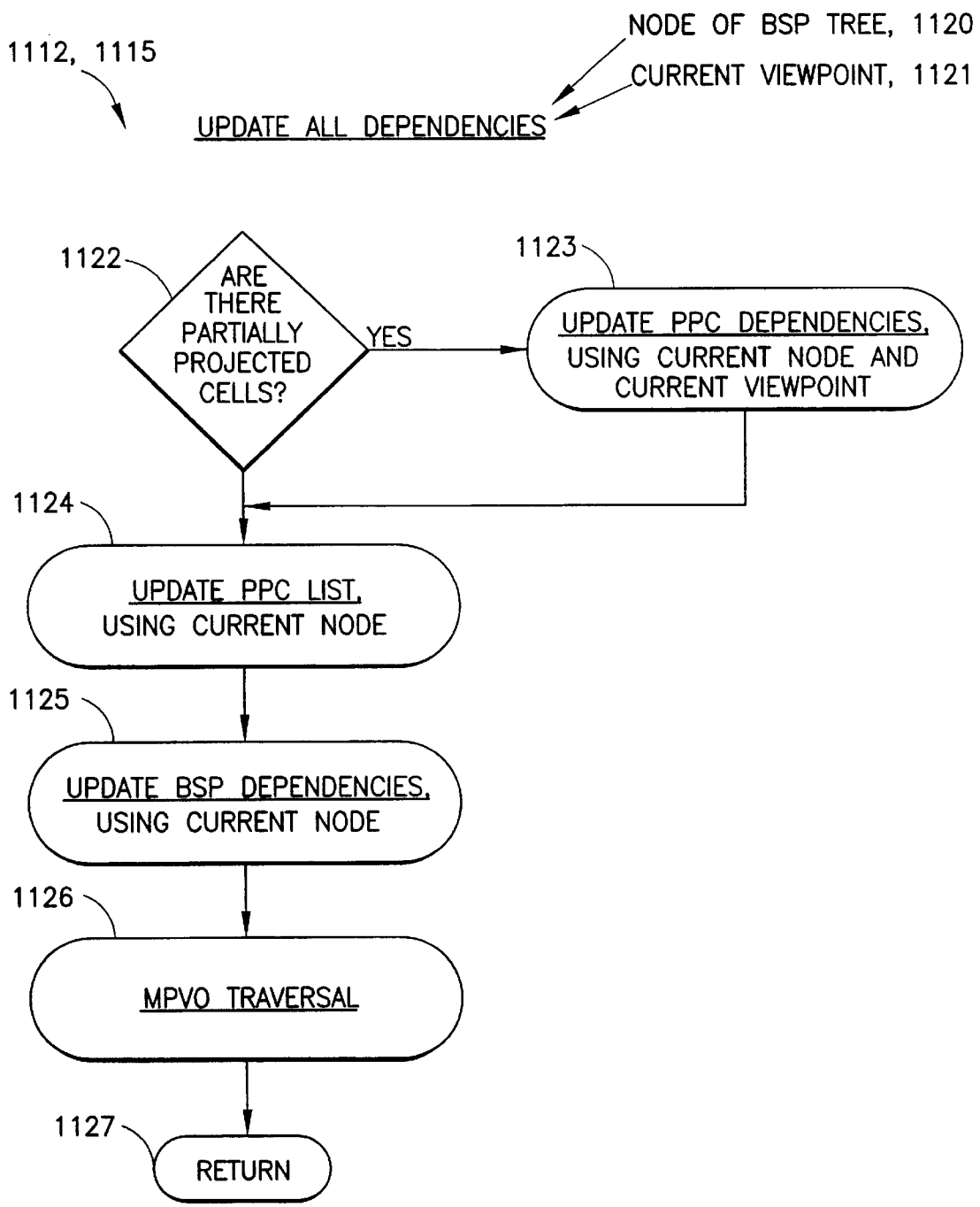
FIG. 11C is a flow chart of an update all dependencies process.

FIG. 11C is a flow chart of the Update All Dependencies process 1112, 1115. The input parameters for this process are a node of the BSP-tree 1120 and the current viewpoint 1121. An initial test is performed 1122 to determine if there are any partially projected cells, or PPCs. Recall that a partially projected cell C is a cell such that one of the pieces, created by the BSP construction, that compose it, say c', has been projected by the BSP, but there exist other pieces of cell C that have not been projected. If there are PPCs, we call another process 1123 to Update PPC Dependencies, using the same input 1120, 1121 as this process. The remaining steps in this process are straightforward. We call three processes: Update PPC List 1124, Update BSP Dependencies 1125, and MPVO Traverse 1126. Finally, we return 1127. See the description FIGS. 11F, 11G, and 11H, below.

Figure 11D:
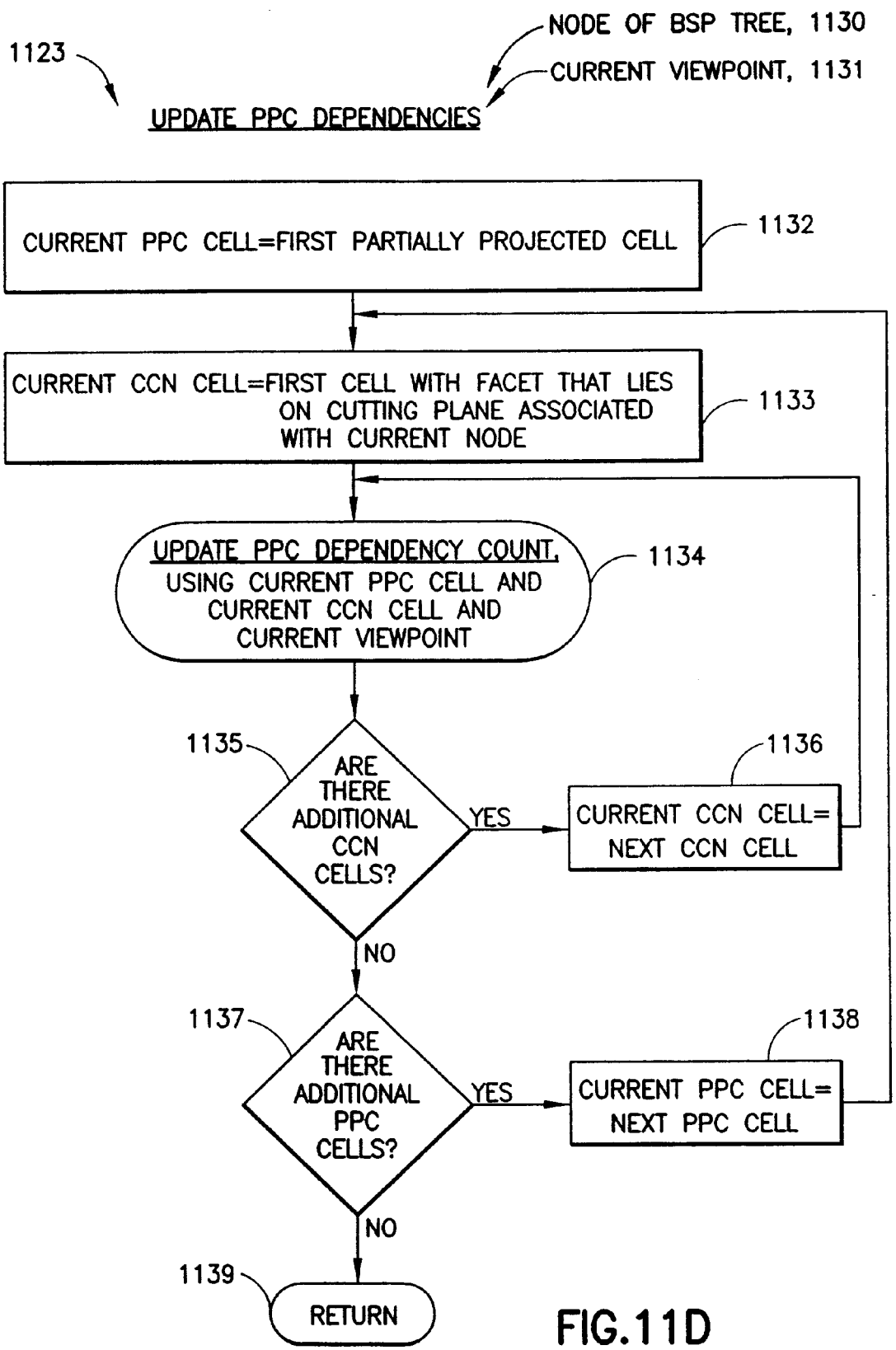
FIG. 11D is a flow chart of an update PPC dependencies process.

The Update PPC Dependencies process 1123 is described by a flow chart in FIG. 11D. The input to this process are a node of the BSP-tree 1130 and the current viewpoint 1131. This process is only called if we know there are partially projected cells, therefore, we begin by assigning 1132 to the current_PPC_cell variable the first partially projected cell. Associated with the current node 1130 is a cutting plane. We assign to the current_CCN_cell variable the first cell with a face that lies on this cutting plane. Clearly there exists at least one such cell since the cutting plane was defined by a face of one of the original input cells 1004. Using the current_PPC_cell and the current_CCN_cell, we call a process 1134 to Update PPC Dependency Count. If there are additional cells which lie on the cutting plane 1135, we update 1136 the current_CCN_cell variable and again call the Update PPC Dependency Count process 1134. If there are no additional CCN cells, we test whether there are additional PPC cells 1137. If there are, we update 1138 the current_PPC_cell variable and again loop through all of the cells with faces that lie on the cutting plane 1133. If there are no remaining PPC cells, we are finished and we return 1139.

Figure 11E:
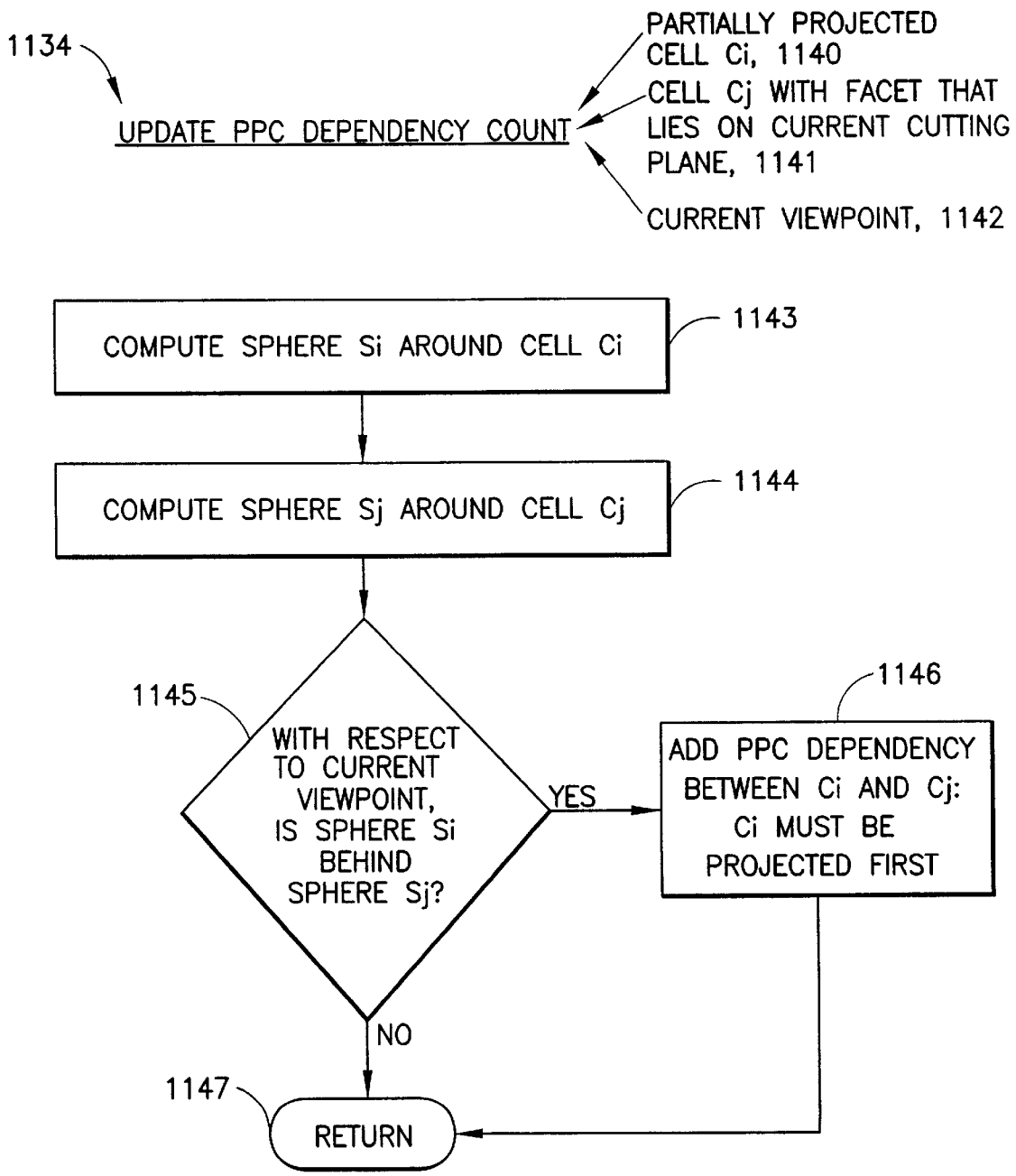
FIG. 11E is a flow chart of an update PPC dependency count process.

FIG. 11E is a flow chart of the Update PPC Dependency Count process 1134. The input to this process are a partially projected cell $C\_i$ 1140, a cell $C\_j$ 1141 with a face which lies on the current cutting plane, and the current viewpoint 1142. Initially we compute the spheres $S\_i$ 1143 and $S\_j$ 1144 around the two input cells $C\_i$ and $C\_j$. With respect to the current viewpoint, we then test 1145 if the sphere $S\_i$ is behind sphere $S\_j$. If it is, we add 1146 a PPC dependency between cells $C\_i$ and $C\_j$, to indicate that cell $C\_i$ must be projected before cell $C\_j$. Either way, the process is finished and we return 1147.

Figure 11F:
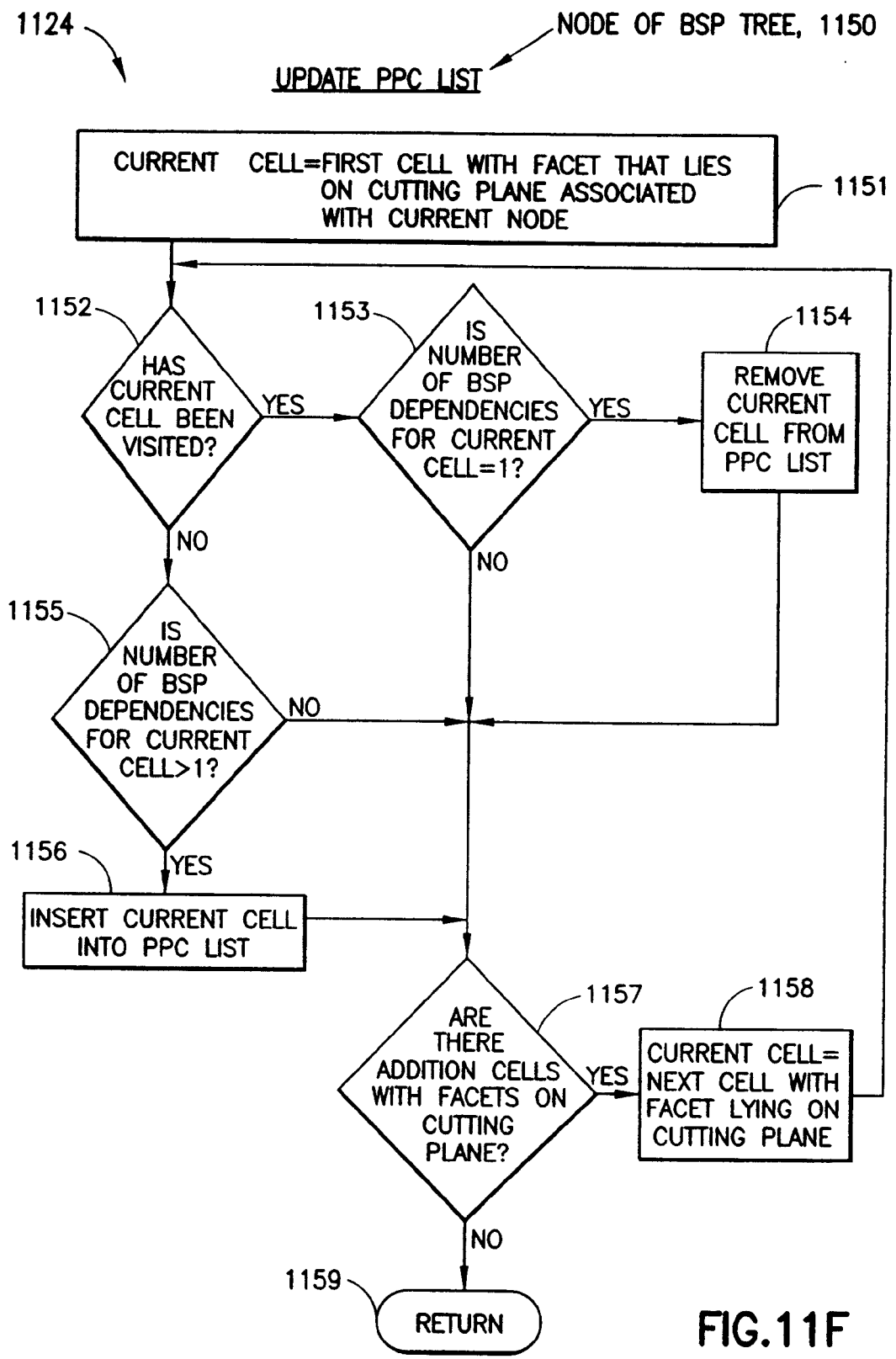
FIG. 11F is a flow chart of an update PPC list process.

The Update PPC List process 1124, described by the flow chart in FIG. 11F, takes one input parameter, a node of the BSP-tree 1150. Associated with each node of the BSP-tree is a cutting plane. The Update PPC List process 1124 considers each cell that has a face which lies on the cutting plane associated with the current node 1150, and determines whether we need to add or delete the cell to the partially projected cell list. Initially, we set 1151 the current_cell variable to be the first cell which has a face that lies on the current cutting plane. If the current_cell has already been visited 1152, meaning that it has already been considered for the partially projected cell list, we determine 1153 if the number of BSP dependencies for the current_cell is equal to one. If so, then the current cutting plane represents this last BSP dependency and so we can remove 1154 the current_cell from the PPC list. If the number of BSP dependencies is greater than one, we will consider any additional cells that have faces which lies on the current cutting plane 1157.

If the current_cell has not been considered for the PPC list yet, we determine 1155 it has more than one BSP dependency. If it does, then we insert 1156 the current_cell to the PPC list. Otherwise, we determine 1157 if there are any remaining cells that have faces which lie on the current cutting plane. If yes, we update 1158 the current_cell variable to be the next such cell, and repeat our tests 1152 to determine if we need to add or delete the cell from the PPC list. Once there are no additional cells to test, we return from this function 1159.

Figure 11G:
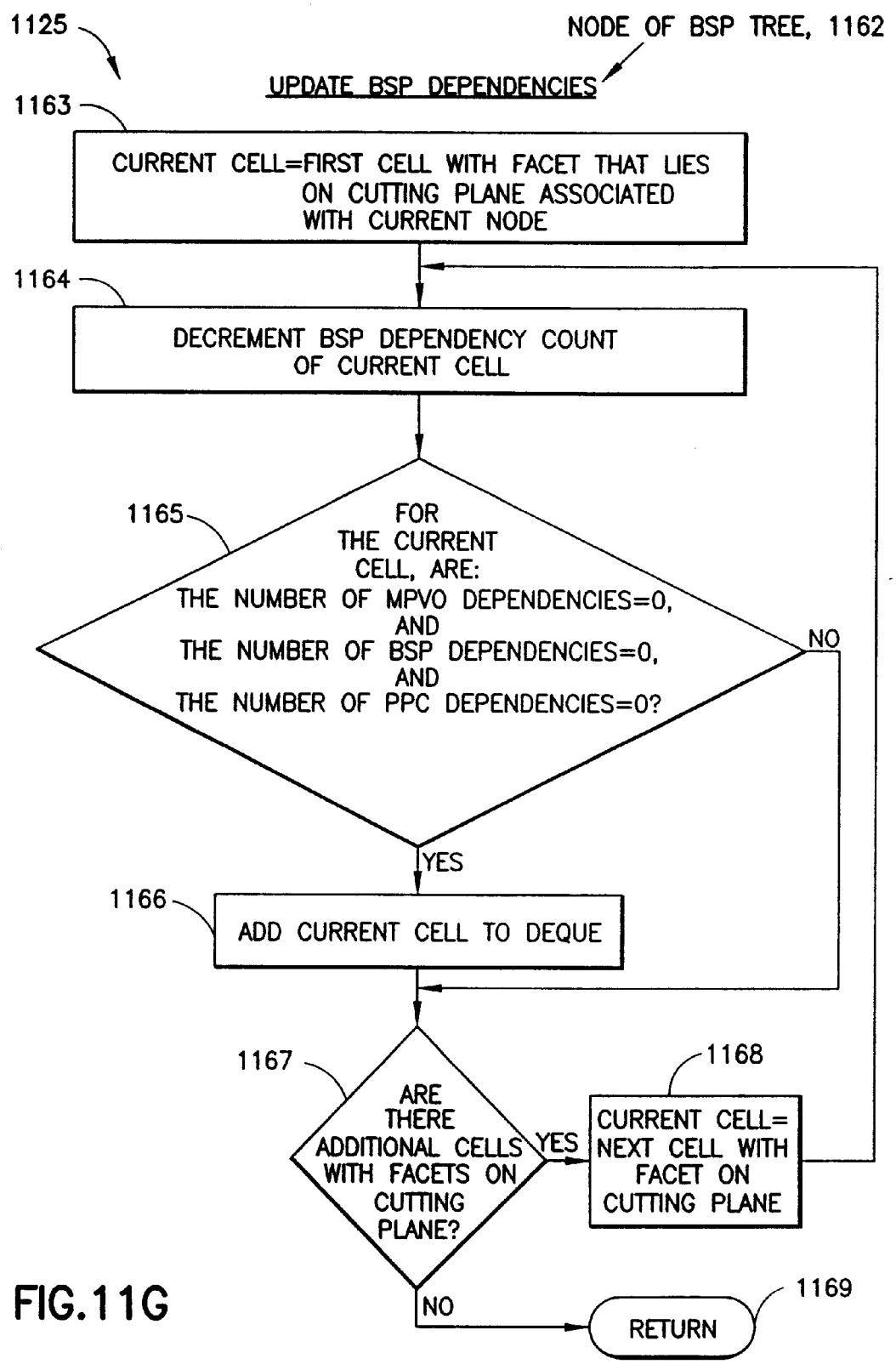
FIG. 11G is a flow chart of an update BSP process.

FIG. 11G details our Update BSP Dependencies process 1125. For a node 1162 of the BSP-tree, the process will decrement the BSP dependency count for each cell that has a face which lies on the cutting plane associated with the current node 1162. Afterward, we determine if any of these cells are now free to be projected. Initially, we assign 1163 the current_cell variable to be the first cell that has a face which lies on the current cutting plane. The BSP dependency count for the current cell is then decremented 1164. If the current_cell has no remaining MPVO, BSP, or PPC dependencies 1165, then we add 1166 the current_cell may be projected and we add it to the DEQUE data structure. If there are additional cells that have faces on the current cutting plane 1167, we update 1168 the current_cell variable to be the next such cell, and repeat this process again 1164. Otherwise, we are finished updating the BSP dependencies for this node and we return 1169.

Figures 1, 11H:
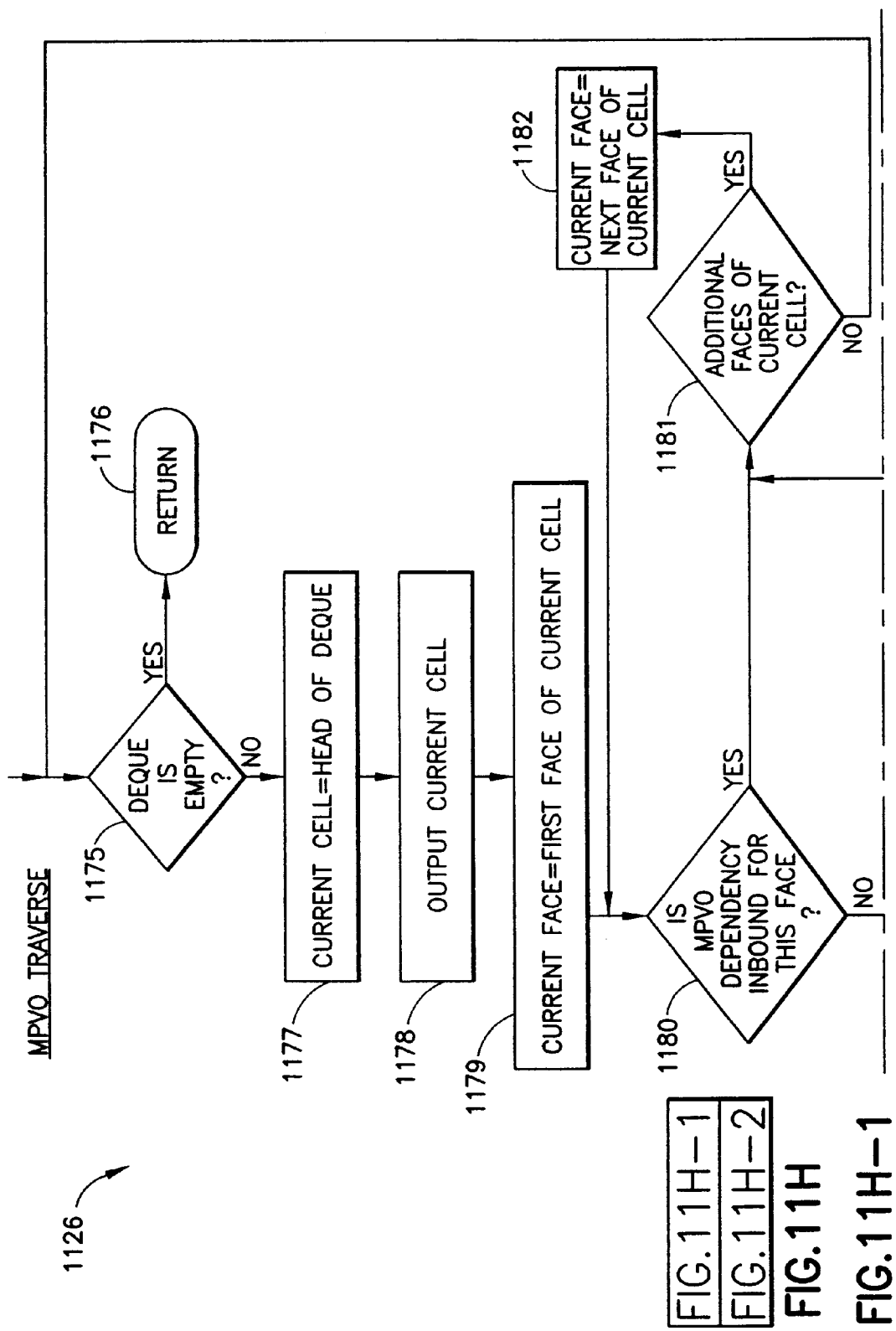
FIG. 11H is a flow chart of a MPVO traverse process.
Figures 2, 11H:
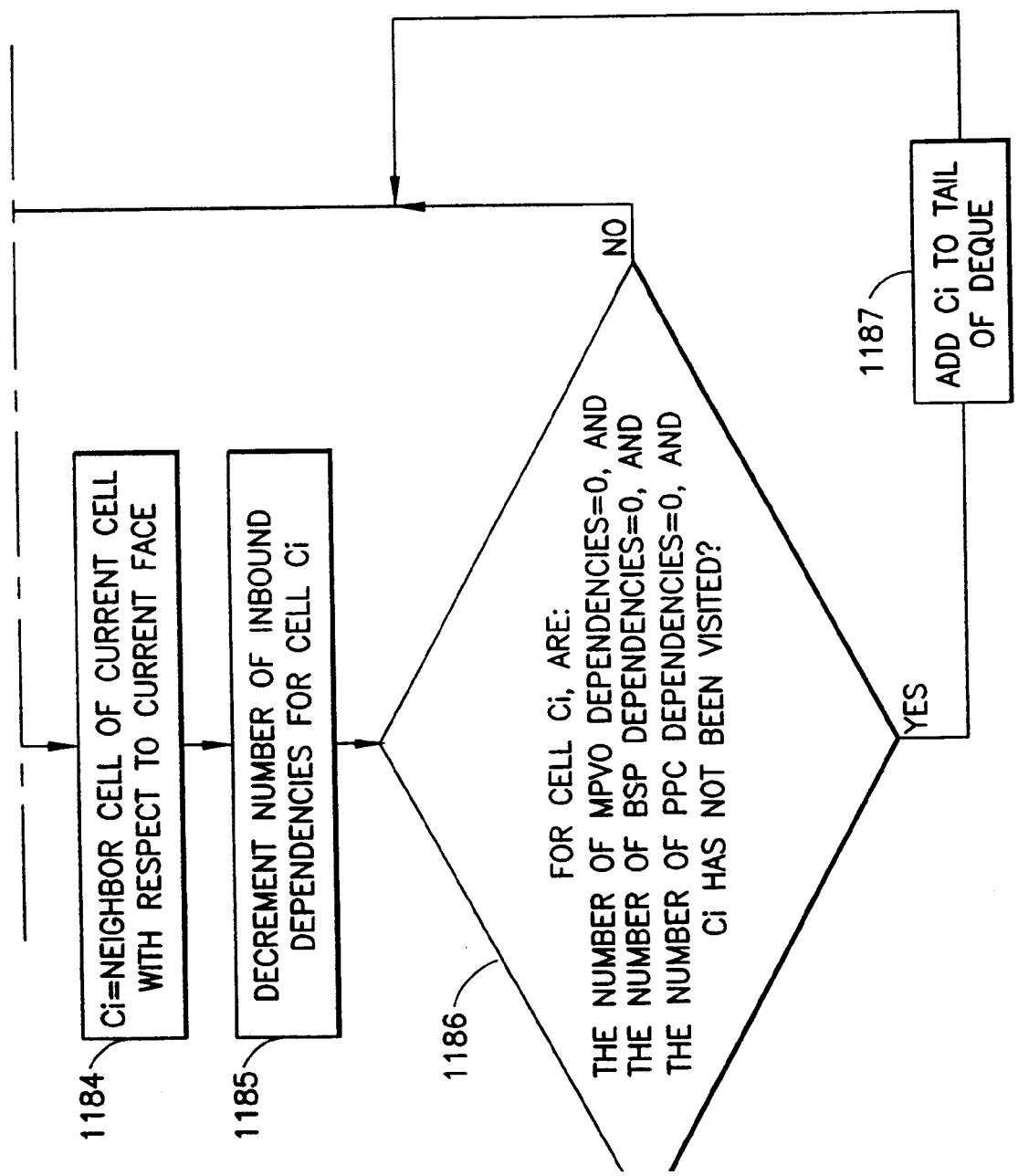

FIG. 11H is a flow chart of our MPVO Traverse process 1126, which is responsible for projecting the input cells in the order determined by the visibility sort. We maintain a DEQUE data structure to determine what cell to project next. Cells to be projected are taken from the head, or front, of the DEQUE, and once cells are determined to be free to be projected are added to the tail, or back, of the DEQUE.

If the DEQUE is empty 1175, we will return 1176 since there is nothing to be done. Otherwise, we set 1177 the current_cell variable to be the cell at the head of the DEQUE, and remove this cell from the DEQUE. The current_cell is then projected 1178. We would like to now update the MPVO dependencies for the cells which are neighbors of the current_cell. Therefore, for each face f of the current_cell, we will consider the cell adjacent to the current_cell, as determined by f, and update the dependency as needed. We assign 1179 the current_face variable to be the first face of the current_cell. If the MPVO dependency for the current face is INBOUND 1180, meaning that the neighboring cell had to be projected before the current_cell, nothing needs to be done. If there are additional faces of the current cell 1181, we update 1182 the current_face to be the next face of the current_cell, and again test what type of MPVO dependency exists for the current_face 1180. If there are no faces remaining, we are done processing the current_cell and we return to test whether there are any additional cells that need to be rendered 1175.

If the MPVO dependency for the current_face is not INBOUND, meaning that the current_cell had to be projected before the neighboring cell, we assign 1184 $C\_i$ to be the neighboring cell of the current_cell with respect to the current_face. We can then decrement 1185 the number of MPVO dependencies for cell $C\_i$ since the current_cell, upon which $C\_i$ was dependent, has just been rendered. If cell $C\_i$ has no MPVO, BSP, or PPC dependencies remaining 1186, we add 1187 $C\_i$ to the DEQUE since it can now be projected. Either way, we then test 1181 if there are additional faces to test for the current cell.

We claim:

1. A computer implemented method for rendering a polyhedral complex of a plurality of polyhedral cells by means of computing a visibility ordering relation, and projecting said polyhedral cells in either back-to-front or front-to-back order, comprising the steps of:

building a visibility ordering graph that includes internal edge data for each of said polyhedral cells that has a shared face with any other of said polyhedral cells and external edge data for each of said polyhedral cells that has a boundary face that is not shared with any other of said polyhedral cells;

sorting said internal edge data and said external edge data of said visibility ordering graph to provide a set of edge data topologically ordering said polyhedral cells in said back-to-front or front-to-back order; and rendering said polyhedral cells by using said set of edge data of said visibility graph.

2. The computer method, as in claim 1, where the computation of the internal edge data of said visibility ordering graph for a pair of said polyhedral cells is done by considering a shared face of said pair of polyhedral cells, and is performed by using a plane equation that defines said shared face and a relation of said shared face to a viewpoint of said polyhedral complex.

3. The computer method, as in claim 1, where the computation of said visibility ordering graph for said external edge data is done by one or more "ray shooting queries" among one or more of said polyhedral cells that do not share a common edge.

4. A computer method, as in claim 3, where the computation of the ray shooting queries is optimized by the use of a planar regular grid.

5. A computer method, as in claim 3, where the computation of the ray shooting queries is optimized by the use of a planar adaptive grid.

6. A computer method, as in claim 3, where the computation of the ray shooting queries is optimized by the use of a sweep plane ray casting technique.

7. The computer method, as in claim 1, where the computation of the external edge data of said visibility ordering graph is further optimized by defining one or more 'super' nodes in said visibility graph.

8. The computer method, as in claim 7, where the computation of the 'super' nodes of said visibility graph is performed by applying a binary-space partitioning tree to said boundary faces of said polyhedral complex containing the polyhedral cells.

* * * * *